US009732001B2

(12) United States Patent
Kakebeeke et al.

(10) Patent No.: US 9,732,001 B2
(45) Date of Patent: Aug. 15, 2017

(54) GEOPOLYMER ACTIVATOR COMPOSITION AND GEOPOLYMER BINDER, PASTE AND CONCRETE PREPARED THEREWITH

(71) Applicant: PQA B.V., Cruquius (NL)

(72) Inventors: Pieter Izaak Jan Kakebeeke, Duiven (NL); Arno Keulen, Utrecht (NL)

(73) Assignee: PQA B.V., Cruquius (NL)

( * ) Notice: Subject to any disclaimer, the term of this patent is extended or adjusted under 35 U.S.C. 154(b) by 143 days.

(21) Appl. No.: 14/403,378

(22) PCT Filed: May 23, 2013

(86) PCT No.: PCT/NL2013/050374
§ 371 (c)(1),
(2) Date: Nov. 24, 2014

(87) PCT Pub. No.: WO2013/176545
PCT Pub. Date: Nov. 28, 2013

(65) Prior Publication Data
US 2015/0321960 A1 Nov. 12, 2015

(30) Foreign Application Priority Data
May 23, 2012 (NL) .................................... 2008863

(51) Int. Cl.
C04B 12/00 (2006.01)
C04B 28/00 (2006.01)
C04B 40/00 (2006.01)
C04B 103/10 (2006.01)

(52) U.S. Cl.
CPC ........ C04B 28/006 (2013.01); C04B 40/0039 (2013.01); C04B 2103/10 (2013.01); Y02P 40/165 (2015.11); Y02W 30/92 (2015.05); Y02W 30/94 (2015.05)

(58) Field of Classification Search
CPC .............................. C04B 12/005; C04B 12/00
See application file for complete search history.

(56) References Cited

U.S. PATENT DOCUMENTS

| | | | | |
|---|---|---|---|---|
| 4,642,137 A * | 2/1987 | Heitzmann | ........... | C04B 12/005 106/607 |
| 5,349,118 A * | 9/1994 | Davidovits | ........... | C04B 12/005 106/624 |
| 6,203,812 B1 * | 3/2001 | Ehrhard | ................ | A01N 25/24 424/405 |
| 7,794,537 B2 * | 9/2010 | Barlet-Gouedard | .. | C04B 28/006 106/600 |

FOREIGN PATENT DOCUMENTS

| | | |
|---|---|---|
| CN | 101570426 A | 11/2009 |
| EP | 2338947 A1 | 6/2011 |
| WO | 0224597 A2 | 3/2002 |

OTHER PUBLICATIONS

Rattanasak, U., et al., "Effect of chemical admixtures on properties of high-calcium fly ash geopolymer", International Journal of Minerals, Metallurgy and Materials, Jun. 2011, pp. 364-369, vol. 18, No. 3.
Altan, Ekin, et al. "Alkali activation of a slag at ambient and elevated temperatures", Cement and Concrete Composites, Elsevier Applied Science, Barking, GB, 2012, pp. 131-139, vol. 34, No. 2.

* cited by examiner

Primary Examiner — Paul Marcantoni
(74) Attorney, Agent, or Firm — The Webb Law Firm

(57) ABSTRACT

The present invention relates to geopolymer compositions comprising additives selected from sugars and derivatives thereof and/or organic acids and salts thereof. The geopolymer compositions of the present invention have sufficient strength to be used for construction purposes. To facilitate the production method of geopolymer paste and concrete compositions the present invention further provides solid and liquid geopolymer activator compositions.

20 Claims, No Drawings

GEOPOLYMER ACTIVATOR COMPOSITION AND GEOPOLYMER BINDER, PASTE AND CONCRETE PREPARED THEREWITH

CROSS-REFERENCE TO RELATED APPLICATIONS

This application is the United States national phase of International Application No. PCT/NL2013/050374 filed. May 23, 2013, and claims priority to Netherlands Patent Application No. 2008863 filed May 23, 2012, the disclosures of which are hereby incorporated in their entirety by reference.

BACKGROUND OF THE INVENTION

Field of the Invention

The present invention relates to a geopolymer activator composition and geopolymer binder, paste and concrete compositions comprising the geopolymer activator composition. The invention further relates to a method for preparing a geopolymer composition on the basis of the geopolymer activator composition.

Description of Related Art

Geopolymer concrete production, i.e. the making of artificial stone, is a promising and potential sustainable technique for the production of the new construction materials. Geopolymer compositions can partially replace the need of currently used conventional construction materials, e.g. cement mortar, cement concrete and asphalt. A replacement of the conventional construction materials has environmental and sustainable advantages, because waste minerals can be used as secondary raw mineral in the production of geopolymers.

Geopolymers are typically formed by reacting an alkaline liquid with a geological based source material. The reaction product from this material can be used to bind aggregate to form concrete. The geological based source materials, i.e. minerals, preferably contain a high content of aluminum, silicon, calcium and iron. Due to high alkalinity of the mixture the solid minerals dissolve to form aluminum, silicon, calcium and iron monomers. The monomers will start to form a polymerized network when contacted with a geopolymer activator composition and, combined with the aggregate, a covalently bonded network grows over time resulting in a concrete that may be more stable compared to cement, which is based on a crystalline bonded network.

The production of geopolymer compositions is costly and typically has a bad workability. An important drawback is the need for elevated temperatures to initiate the geopolymerization process, which is important to increase the compressive strength of the geopolymer material. Furthermore, another drawback is the need for excessive amounts of alkaline components.

The present invention aims to provide a geopolymer concrete or paste composition that can be cured at ambient temperature and simultaneously have sufficient strength and are less costly to prepare compared to the production methods known in the art.

SUMMARY OF THE INVENTION

The invention thereto provides a geopolymer activator composition comprising an alkaline activator having a molarity of more than about 1.0 M; and additives having a molarity in the range of about 0.001 to about 0.2 M, wherein the additives are selected from a sugar and derivatives thereof and/or an organic acid and salts thereof.

The term "about" as used herein is intended to include values, particularly within 10% of the stated values.

A geopolymer paste and/or concrete composition prepared on the basis of the geopolymer activator composition exhibits satisfactory levels of strength, in particular compressive strength while allowing curing at ambient temperature, i.e. without the need for additional heating, in a period of time that is common in the art.

The term "ambient temperature" as used herein, refers to the "temperature of the surroundings". Since the geopolymer compositions of the present invention are used in construction of building materials or the like, the "temperature of the surroundings" is equal to the outside temperature (i.e. atmospheric temperature).

Surprisingly, it was found that the geopolymer concrete or paste composition of the present invention can be cured at temperatures lower than 5° C. The curing temperature may be even lower than 0° C., e.g. about −5° C., about −10° C. or even about −15° C. Paste or concrete compositions currently available cannot provide sufficient strength when cured at temperatures below 5° C. Preferably the temperature of curing is equal or higher than about −5° C., more preferably the temperature is in the range of about 5° C. to 50° C. and even more preferred the temperature is in the range of about 10° C. to 30° C.

In another embodiment of the invention, a geopolymer activator composition is provided comprising an alkaline activator having a molarity of more than about 1.0, additives having a molarity in the range of about 0.001 to about 0.2; and soluble silicate preferably having a molarity in the range of about 0.01 to about 2.0, wherein the additives are selected from a sugar and derivatives thereof and/or an organic acid and salts thereof.

In another aspect of the invention, a geopolymer composition is provided in the form of a geopolymer paste composition (e.g. a mortar) comprising fine aggregates, and the geopolymer binder composition, i.e. the geopolymer activator composition of the present invention combined with minerals, in accordance with the invention in which the additives are present in small amounts. The viscosity of the geopolymer paste composition is preferably more than about 25,000 cP. More preferred the viscosity of the geopolymer paste composition is more than about 75,000 cP. Most preferred the viscosity of the geopolymer paste composition is more than about 150,000 cP. The geopolymer composition of the present invention may be in the form of a material of which the viscosity cannot be measured, e.g. earth-moist materials or the like.

The term "alkaline activator" as used herein is intended to include an alkaline bicarbonate activator, an alkaline silicate activator, e.g. sodium silicate and/or potassium silicate and/or an alkaline hydroxide activator, e.g. sodium hydroxide, potassium hydroxide and/or other earth metal hydroxide or alkaline solutions. The alkaline activators suitable for use in the present invention are those alkaline activators commonly used in the field of geopolymer concrete production. Since the alkaline activators are used in building materials one should understand that the use of alkaline activators which may harm the environment is preferably avoided.

In another aspect of the invention, a geopolymer composition is provided in the form of a geopolymer concrete compositions comprising coarse aggregates and the geopolymer past composition, i.e. the geopolymer binder composition in accordance with the invention combined with fine aggregates.

Aggregates used in the present invention can be selected from any kind of aggregates used for paste or concrete preparation. Preferably the aggregates are selected from coarse aggregate, fine aggregate and other materials used in construction, including sand, gravel, crushed stone or recycled crushed concrete and waste minerals. In the geopolymer paste composition of the present invention preferably fine aggregates are used. Preferably a mixture of coarse aggregate and fine aggregate is used in the geopolymer concrete composition of the present invention.

The term "coarse aggregate" as used herein is material having a grain diameter size of at least 4 millimeter (mm). The term "fine aggregate" as used herein is material having a grain diameter size of less than 4 mm.

The minerals of the present invention having a high content (i.e. at least 30% m/m, preferably at least 40% m/m and most preferred at least 50% m/m) of aluminum, silicon, calcium, iron or combinations thereof. Preferred minerals are powder coal fly ash, (ground granulated) blast furnace slag, meta kaolin, industrial slags, industrial incineration ashes, waste minerals, sludge, soils and other pozzolanic materials. Preferably the geopolymer paste or concrete compositions of the present invention comprise a combination of powder coal fly ash and (ground granulated) blast furnace slag.

The additives are selected from complexing agents comprising reactive complexing groups, e.g. hydroxyl-, and/or carboxyl-groups. The reactive groups of the complexing agents preferably are suitable for forming a covalent bound between the complexing agents and the minerals used in the geopolymer past or concrete compositions of the present invention.

The additives in the geopolymer activator composition are selected from sugars and derivatives thereof and/or organic acids and salts thereof. Preferred sugars are monosaccharides, e.g. glucose, fructose and galactose, disaccharides, e.g. sucrose, maltose and lactose, oligosaccharides, e.g. dextrin, maltodextrin and starch, polysaccharides, e.g. cellulose, dextran and sugar like polymer structures. Furthermore, products comprising mixtures of sugars, such as molasses, can be used as well. Additionally, honey, fruit juices and waste materials, such as rotten fruit, can form a potential source for sugars suitable as additives in the geopolymer mixtures of the present invention. The above defined sugar derivatives may be selected from sugar alcohols, natural sugar substitutes, e.g. sorbitol, lactitol, glycerol, isomalt, maltitol, mannitol, stevia and xylitol, and synthetic sugar substitute, i.e. artificial sweeteners, e.g. aspartame, alitame, dulcin, glucin, cyclamate, saccharin, sucralose and lead acetate. Preferably the geopolymer paste or concrete compositions of the present invention comprise sucrose, fructose and/or lactose, optionally in combination with monosaccharides, disaccharides, polysaccharides and/or oligosaccharides.

Preferred organic acids are (vinylogous) carboxylic acids, e.g. oxalic acid, ascorbic acid, lactic acid, uric acid, citric acid and tartaric acid. It was found that a geopolymer activator composition comprising an inorganic acid did not result in a geopolymer activator composition suitable for use in the preparation of geopolymer compositions. Preferably the geopolymer concrete of the present invention comprises tartaric acid and/or ascorbic acid.

Preferred salts used in the geopolymer paste or concrete composition may be calcium citrate, sodium citrate and/or sugar salts, e.g. sodium gluconate. In a further preferred embodiment of the present invention, the geopolymer paste or concrete composition may comprise sucrose, fructose, lactose, tartaric acid, ascorbic acid, sodium gluconate and combinations thereof.

The list of possible additives is not limited to the additives mentioned above, other sugars and derivatives thereof and/or organic acids and salts thereof may be used as well in the geopolymer paste or concrete composition of the present invention.

The use of additives as defined above reduces the concentration of alkaline activator needed in the geopolymer paste or concrete composition of the present invention. Furthermore, the use of additives increases the final strength, e.g. after 28 days curing time and the final material properties of the geopolymer paste or concrete composition. Also the workability of geopolymer compositions is improved by using the additives compositions of the present invention.

In a preferred embodiment, the geopolymer compositions of the present invention in the form of binder, paste or concrete compositions comprise a mineral mixture comprising powder coal fly ash and blast furnace slag. The major constituent of blast furnace slag is calcium, silicon and aluminum. It was found that the calcium silicate and calcium aluminate present in the blast furnace slag may have a positive effect on the polymerization process. In the preferred embodiment the concentration of blast furnace slag is more than about 5% by weight of the total weight of powder coal fly ash and blast furnace slag. More preferred the concentration is in the range of about 5 to 40% by weight of the total weight of powder coal fly ash and blast furnace slag and even more preferred the concentration of blast furnace slag is in the range of about 10 to 35% by weight of the total weight of powder coal fly ash and blast furnace slag. Most preferred the concentration blast furnace slag is in the range of about 15 to 30% by weight of the total weight of powder coal fly ash and blast furnace slag.

The geopolymer paste or concrete composition of the present invention is prepared by mixing or blending fine and/or coarse aggregates and minerals followed by the addition of additives and an alkaline activator, wherein the additives and alkaline activator are preferably added together using an additive/alkaline activator solution. A solution comprising additive and alkaline activator is preferred since such solution increases the workability of the geopolymer composition. Additionally, but not necessarily, soluble silicate can be added in to tuning the curing process, e.g. by increasing the speed of the curing process.

The term "soluble silicate" as used herein is intended to include silicates, which are soluble in water and/or alkali, in particular silicates include sodium, potassium and lithium silicates which are generally not distinct stoichiometric chemical substances (i.e. with a specific chemical formula and molecular weight), but rather aqueous solutions of glasses, resulting from combinations of alkali metal oxide and silica in varying proportions. The general formula for soluble alkali silicates is:

$$M_2O \cdot xSiO_2$$

where M is Na, K or Li, and x is the molar ratio, defining the number of moles silica ($SiO_2$), including disilicates, per mole of alkali metal oxide ($M_2O$).

In order to facilitate the geopolymer paste or concrete production method mentioned above, the present invention provides a geopolymer activator composition comprising alkaline activator and additives in accordance with claim 1, and optionally, soluble silicates in accordance with claim 3. Such a geopolymer activator composition can be in the form of a powder or a solution (e.g. a ready-to-use aqueous solution). In case the geopolymer activator composition is in the form of a powder, water is preferably added to the resulting mixture of aggregates and geopolymer activator composition.

In another embodiment of the present invention, the geopolymer paste or concrete composition of the present invention is prepared by mixing or blending fine and/or coarse aggregates followed by the addition of minerals, additives and an alkaline activator, wherein the minerals, additives and alkaline activator are preferably added together in the form of a powder. Additionally, but not necessarily, soluble silicate can be added in to tuning the curing process.

In order to facilitate the geopolymer paste or concrete production method mentioned in the previous paragraph, the present invention provides a geopolymer composition, such as a geopolymer binder composition, comprising alkaline activator, additives, minerals and optionally, soluble silicates. The geopolymer binder composition therefore comprises the geopolymer activator composition of the present invention and minerals. Such geopolymer binder composition can be in the form of a powder or a solution (e.g. a ready-to-use aqueous solution). In case the geopolymer binder composition is in the form of a powder, water needs to be added to the resulting mixture of aggregates and geopolymer binder composition. The geopolymer binder composition can be prepared by adding the minerals used in the present invention to the geopolymer activator composition described above.

In a preferred embodiment in order to produce a geopolymer concrete or paste composition of the present invention the geopolymer activator composition comprises about 1.0 to about 20 M alkaline activator. It was found that a geopolymer activator composition comprising more than 20 M alkaline activator resulted in a mixture having a too high viscosity which was no longer suitable as an activator composition for use in the preparation of geopolymer compositions. Preferably the geopolymer activator composition comprises about 1.0 to about 15 M alkaline activator, even more preferably about 1.0 to about 10 M alkaline activator. More preferred the geopolymer activator composition comprises about 1.4 to about 8.0 M alkaline activator. Even more preferred the geopolymer activator composition comprises about 1.6 to about 7.0 M alkaline activator. Even further preferred the geopolymer activator composition comprises about 1.8 to about 6.0 M alkaline activator or about 2.0 to about 5.0 M alkaline activator. In particular, the geopolymer activator composition comprises about 2.0 to about 3.0 M alkaline activator or about 3.0 to about 4.0 M alkaline activator.

In another preferred embodiment the geopolymer activator composition further comprises less than about 3.0 M soluble silicate, preferably the geopolymer activator composition comprises in the range of 0 to about 2.0 M soluble silicate. More preferred the geopolymer activator composition comprises in the range of about 0.01 to about 1.5 M soluble silicate. Most preferred the geopolymer activator composition comprises in the range of about 0.1 to about 1.0 M soluble silicate. In case soluble silicate is used in the geopolymer activator composition, less amount of alkaline activator is needed to provide a geopolymer paste or concrete composition having a sufficient strength after curing for 28 days.

Furthermore, the geopolymer activator composition comprises in the range of about 0.001 to about 0.2 M additives. Preferably, the additives having a cumulative molarity in the range of about 0.002 to about 0.15 M, preferably in the range of about 0.003 to about 0.13 M. More preferred the geopolymer activator composition has a cumulative molarity of additives in the range of about 0.004 to about 0.12 M or in the range of about 0.005 to about 0.10 M. Even more preferred the geopolymer activator composition has a cumulative molarity of additives in the range of about 0.01 to about 0.05 M. Most preferred the geopolymer activator composition has a cumulative molarity of additives in the range of about 0.02 to about 0.04 M.

Surprisingly, the geopolymer paste or concrete composition of the present invention can be prepared by a geopolymer activator composition (or geopolymer binder composition, i.e. a geopolymer activator composition further comprising minerals) comprising alkaline activator and additives without the presence of a soluble silicate. Preferably such geopolymer mixture is cured in the range of about 5 to 80° C., more preferably the geopolymer mixture is cured in the range of about 10 to 60° C., even more preferably the geopolymer mixture is cured in the range of about 15 to 40° C. and most preferred the geopolymer mixture is cured in the range of about 20 to 30° C.

The geopolymer mixture of the present invention can be cured at ambient temperatures to form the geopolymer of the present invention comprising aggregates and a geopolymer binder composition. The concentration of the additives in the geopolymer binder composition can be chosen within broad ranges and depends on the amount of minerals used. Preferably, the concentration of the additives in the geopolymer binder composition is less than about 1.20% by weight of the minerals present in the geopolymer, preferably less than about 0.80% by weight. Preferably the concentration of the additives is in the range of about 0.01 to 0.70% by weight of the minerals, more preferably the concentration of the additives is in the range of about 0.10 to 0.60% by weight of the minerals, and even more preferred the concentration of the additives is in the range of about 0.15 to 0.50% by weight of the minerals.

When cured in the range of about 5 to 30° C., the geopolymer paste or concrete compositions of the present invention comprising a geopolymer binder composition having a preferred concentration additives in the range of about 0.10 to 0.40% by weight of the minerals. More preferred the concentration of the additives is in the range of about 0.15 to 0.35% by weight of the minerals and most preferred the concentration of the additives is in the range of about 0.20 to 0.30% by weight of the minerals.

In another preferred embodiment, the geopolymer paste or concrete compositions of the present invention comprise a concentration of geopolymer activator composition of less than about 15% by weight of the total weight of the geopolymer mixture. More preferably the concentration of geopolymer activator composition is between in the range of about 5 to 10% by weight of the total weight of the geopolymer concrete mixture.

In even another embodiment, the geopolymer paste or concrete compositions of the present invention comprise a concentration of minerals of more than about 5% by weight of the total weight of the geopolymer mixture. More preferably the geopolymer paste or concrete compositions comprises a concentration of minerals of more than about 10% by weight of the total weight of the geopolymer mixture. Even more preferred the geopolymer paste or concrete compositions comprise a concentration of minerals in the range of about 10 and 35% by weight of the total weight of the geopolymer mixture. Most preferred is a geopolymer paste or concrete composition comprising a concentration of minerals in the range of about 15 to 25% by weight of the total weight of the geopolymer mixture.

Furthermore, the geopolymer paste or concrete compositions of the present invention comprise a concentration of fine and/or coarse aggregates of more than about 30% by weight of the total weight of the geopolymer mixture, preferably more than about 40% by weight of the total weight of the geopolymer mixture. Even more preferred the concentration of fine and/or coarse aggregates comprised in the geopolymer mixture is more than about 50%. Most preferred is a geopolymer paste or concrete composition comprising a concentration of fine and/or coarse aggregates of more than about 75% by weight of the total weight of the geopolymer mixture.

The invention will now be further illustrated with reference to the following examples.

EXAMPLES

Fine and coarse aggregate, powder coal fly ash and blast furnace slag were mixed with a solution of sodium hydroxide, sodium silicate and additives selected from sucrose, glucose, ascorbic acid, citric acid and tartaric in a rotating pan mixer for 3 minutes. After mixing the geopolymer mortar was pored in moulds, for curing over time at ambient temperatures. Compressive strength was measured on cubic blocks of 40 by 40 by 40 mm.

Tables 1-9 give an overview of the compressive strengths, after a curing period of 28 days (at 20° C.), of the geopolymer mixtures of the present invention prepared by the method given above. The compressive strengths are compared with a geopolymer mixture (hereinafter the "reference"), without comprising additives of the present invention, containing:

1350 gram fine and coarse aggregate;
350 gram powder coal fly ash;
100 gram blast furnace slag; and
160 ml alkaline liquid solution comprising 5.6 M sodium hydroxide and 0.125 M sodium silicate and water.

The reference mixture was cured under the same conditions as the geopolymer mixtures of the present invention. The strength of the reference mixture was measured after 28 days as well.

Table 10 gives an overview of the compressive strengths, after a curing period of 14 days (at 20° C.), of the geopolymer mixtures of the present invention prepared by the method given above. The compressive strengths are compared with the strength of the above-mentioned reference mixture measured after 14 days as well.

TABLE 1

Geopolymer mixtures (G1-G6) with different concentrations sodium hydroxide

|  | Ref. | G1 | G2 | G3 | G4 | G5 | G6 |
|---|---|---|---|---|---|---|---|
|  |  |  |  | (grams) |  |  |  |
| Aggregate[a] | 1350 | 1350 | 1350 | 1350 | 1350 | 1350 | 1350 |
| PCFA[b] | 350 | 350 | 350 | 350 | 350 | 350 | 350 |
| Slag[c] | 100 | 100 | 100 | 100 | 100 | 100 | 100 |
| 10M NaOH | 90 | 90 | 140 | 120 | 70 | 40 | 20 |
| 1M Sodium silicate | 20 | 20 | 20 | 20 | 20 | 20 | 20 |
| Water | 50 | 50 | 0 | 20 | 70 | 100 | 120 |
| Sucrose | 0 | 1 | 1 | 1 | 1 | 1 | 1 |
| Molarity sucrose | 0 | 0.018 | 0.018 | 0.018 | 0.018 | 0.018 | 0.018 |
| Molarity NaOH | 5.6 | 5.6 | 8.75 | 7.5 | 4.3 | 2.5 | 1.25 |
| Strength (N/mm$^2$) | 23.8 | 42.2 | 37.9 | 37.7 | 32.6 | 0.4 | 0.0 |
| Ratio (1.00 = reference) | 1.00 | 1.77 | 1.59 | 1.58 | 1.37 | 0.02 | 0.00 |

[a]Aggregate = mix of fine and coarse aggregate;
[b]PCFA = powder coal fly ash;
[c]Slag = blast furnace slag

TABLE 2

Geopolymer mixtures (G7-G11) with different concentrations sucrose

|  | Ref. | G7 | G8 | G9 | G10 | G11 |
|---|---|---|---|---|---|---|
|  |  |  |  | (grams) |  |  |
| Aggregate[a] | 1350 | 1350 | 1350 | 1350 | 1350 | 1350 |
| PCFA[b] | 350 | 350 | 350 | 350 | 350 | 350 |
| Slag[c] | 100 | 100 | 100 | 100 | 100 | 100 |
| 10M NaOH | 90 | 90 | 90 | 90 | 90 | 90 |
| 1M Sodium silicate | 20 | 20 | 20 | 20 | 20 | 20 |
| Water | 50 | 50 | 50 | 50 | 50 | 50 |
| Sucrose | 0 | 0.5 | 1 | 2 | 4 | 8 |
| Molarity sucrose | 0 | 0.009 | 0.018 | 0.036 | 0.073 | 0.146 |
| Wt-% sucrose | 0 | 0.11 | 0.22 | 0.44 | 0.89 | 1.78 |
| Strength (N/mm$^2$) | 23.8 | 35.0 | 42.2 | 34.9 | 21.5 | 0.6 |
| Ratio (1.00 = reference) | 1.00 | 1.47 | 1.77 | 1.47 | 0.90 | 0.03 |

[a]Aggregate = mix of fine and coarse aggregate;
[b]PCFA = powder coal fly ash;
[c]Slag = blast furnace slag

TABLE 3

Geopolymer mixtures (G12-G16) with different additives

|  | Ref. | G12 | G13 | G14 | G15 | G16 |
|---|---|---|---|---|---|---|
|  | (grams) | | | | | |
| Aggregate[a] | 1350 | 1350 | 1350 | 1350 | 1350 | 1350 |
| PCFA[b] | 350 | 350 | 350 | 350 | 350 | 350 |
| Slag[c] | 100 | 100 | 100 | 100 | 100 | 100 |
| 10M NaOH | 90 | 90 | 90 | 90 | 90 | 90 |
| 1M Sodium silicate | 20 | 20 | 20 | 20 | 20 | 20 |
| Water | 50 | 50 | 50 | 50 | 50 | 70 |
| Additive | 0 | 1 | 1 | 1 | 4 | 1 |
| Additive | — | Sucrose | Glucose | Ascorbic acid | Citric acid | Tartaric acid |
| Molarity additive | 0 | 0.018 | 0.035 | 0.036 | 0.130 | 0.037 |
| Strength (N/mm$^2$) | 23.8 | 42.2 | 29.9 | 40 | 25.9 | 32.3 |
| Ratio (1.00 = reference) | 1.00 | 1.77 | 1.26 | 1.68 | 1.23 | 1.36 |

[a]Aggregate = mix of fine and coarse aggregate;
[b]PCFA = powder coal fly ash;
[c]Slag = blast furnace slag

TABLE 4

Geopolymer mixtures (G17-G22) with different concentrations sodium silicate

|  | Ref. | G17 | G18 | G19 | G20 | G21 | G22 |
|---|---|---|---|---|---|---|---|
|  | (grams) | | | | | | |
| Aggregate[a] | 1350 | 1350 | 1350 | 1350 | 1350 | 1350 | 1350 |
| PCFA[b] | 350 | 350 | 350 | 350 | 350 | 350 | 350 |
| Slag[c] | 100 | 100 | 100 | 100 | 100 | 100 | 100 |
| Alkaline liquid solution | 160 | 160 | 160 | 160 | 160 | 160 | 160 |
| Sucrose | 0 | 1 | 1 | 1 | 1 | 1 | 1 |
| Molarity sucrose | 0 | 0.018 | 0.018 | 0.018 | 0.018 | 0.018 | 0.018 |
| Molarity NaOH | 5.6 | 5.6 | 5.6 | 5.6 | 5.6 | 5.6 | 5.6 |
| Molarity sodium silicate | 0.125 | 0 | 0.125 | 0.250 | 0.5 | 1.0 | 2.0 |
| Strength (N/mm$^2$) | 23.8 | 39.3 | 42.2 | 39.9 | 42.4 | 38.9 | 34.4 |
| Ratio (1.00 = reference) | 1.00 | 1.65 | 1.77 | 1.68 | 1.78 | 1.63 | 1.45 |

[a]Aggregate = mix of fine and coarse aggregate;
[b]PCFA = powder coal fly ash;
[c]Slag = blast furnace slag

TABLE 5

Geopolymer mixtures (G23-G28) with different PCFA/Slag ratio

|  | Ref. | G23 | G24 | G25 | G26 | G27 | G28 |
|---|---|---|---|---|---|---|---|
|  | (grams) | | | | | | |
| Aggregate[a] | 1350 | 1350 | 1350 | 1350 | 1350 | 1350 | 1350 |
| PCFA[b] | 350 | 425 | 400 | 375 | 350 | 325 | 300 |
| Slag[c] | 100 | 25 | 50 | 75 | 100 | 125 | 150 |
| 10M NaOH | 90 | 90 | 90 | 90 | 90 | 90 | 90 |
| 1M Sodium silicate | 20 | 20 | 20 | 20 | 20 | 20 | 20 |
| Water | 50 | 50 | 50 | 50 | 50 | 50 | 50 |
| Sucrose | 0 | 1 | 1 | 1 | 1 | 1 | 1 |
| Wt-% slag | 22 | 6 | 11 | 17 | 22 | 28 | 33 |
| Strength (N/mm$^2$) | 23.8 | 17.2 | 25.5 | 37.2 | 41.8 | 49.9 | 50.2 |
| Ratio (1.00 = reference) | 1.00 | 0.72 | 1.07 | 1.56 | 1.76 | 2.10 | 2.11 |

[a]Aggregate = mix of fine and coarse aggregate;
[b]PCFA = powder coal fly ash;
[c]Slag = blast furnace slag

TABLE 6

Geopolymer mixtures (G29-G33) with different amounts of alkaline liquid solution

|  | Ref. | G29 | G30 | G31 | G32 | G33 |
|---|---|---|---|---|---|---|
|  |  |  | (grams) |  |  |  |
| Aggregate[a] | 1350 | 1350 | 1350 | 1350 | 1350 | 1350 |
| PCFA[b] | 350 | 350 | 350 | 350 | 350 | 350 |
| Slag[c] | 100 | 100 | 100 | 100 | 100 | 100 |
| Alkaline liquid solution | 160 | 120 | 140 | 160 | 180 | 200 |
| Sucrose | 0 | 1 | 1 | 1 | 1 | 1 |
| Molarity sucrose | 0 | 0.024 | 0.021 | 0.018 | 0.016 | 0.015 |
| Molarity NaOH | 5.6 | 5.6 | 5.6 | 5.6 | 5.6 | 5.6 |
| Molarity sodium silicate | 0.125 | 0.125 | 0.125 | 0.125 | 0.125 | 0.125 |
| Wt-% alkaline liquid | 8.16 | 6.25 | 7.22 | 8.16 | 9.09 | 10.0 |
| Wt-% sucrose | 0 | 0.17 | 0.19 | 0.22 | 0.25 | 0.28 |
| Strength (N/mm$^2$) | 23.8 | 33 | 41.6 | 45.1 | 34.7 | 25.8 |
| Ratio (1.00 = reference) | 1.00 | 1.39 | 1.75 | 1.89 | 1.46 | 1.08 |

[a]Aggregate = mix of fine and coarse aggregate;
[b]PCFA = powder coal fly ash;
[c]Slag = blast furnace slag

TABLE 7

Geopolymer mixtures (G34-G40) with different amounts of binders (same slag ratio)

|  | Ref. | G34 | G35 | G36 | G37 | G38 | G39 | G40 |
|---|---|---|---|---|---|---|---|---|
|  |  |  |  | (grams) |  |  |  |  |
| Aggregate[a] | 1350 | 1350 | 1350 | 1350 | 1350 | 1350 | 1350 | 1350 |
| PCFA[b] | 350 | 195 | 273 | 350 | 428 | 506 | 583 | 661 |
| Slag[c] | 100 | 55 | 77 | 100 | 122 | 144 | 167 | 189 |
| Alkaline liquid solution | 160 | 130 | 150 | 160 | 180 | 200 | 220 | 240 |
| Sucrose | 0 | 1 | 1 | 1 | 1 | 1 | 1 | 1 |
| Molarity sucrose | 0 | 0.022 | 0.019 | 0.018 | 0.016 | 0.015 | 0.013 | 0.012 |
| Molarity NaOH | 5.6 | 5.6 | 5.6 | 5.6 | 5.6 | 5.6 | 5.6 | 5.6 |
| Molarity sodium silicate | 0.125 | 0.125 | 0.125 | 0.125 | 0.125 | 0.125 | 0.125 | 0.125 |
| Wt-% binders | 23.0 | 14.5 | 18.9 | 23.0 | 26.4 | 29.5 | 32.3 | 34.8 |
| Strength (N/mm$^2$) | 23.8 | 37.5 | 33 | 42.1 | 46 | 50 | 48.8 | 48 |
| Ratio (1.00 = reference) | 1.00 | 1.58 | 1.39 | 1.77 | 1.93 | 2.10 | 2.05 | 2.02 |

[a]Aggregate = mix of fine and coarse aggregate;
[b]PCFA = powder coal fly ash;
[c]Slag = blast furnace slag

TABLE 8

Geopolymer mixtures (G41-G44) comprising a combination of sucrose and acids

|  | Ref. | G41 | G42 | G43 | G44 |
|---|---|---|---|---|---|
|  |  |  | (grams) |  |  |
| Aggregate[a] | 1350 | 1350 | 1350 | 1350 | 1350 |
| PCFA[b] | 350 | 350 | 350 | 350 | 350 |
| Slag[c] | 100 | 100 | 100 | 100 | 100 |
| Alkaline liquid solution | 160 | 160 | 160 | 160 | 160 |
| Sucrose | 0 | 1 | 1 | 1 | 1 |
| Acid | 0 | 1 | 1 | 1 | 1 |
| Acid | — | Citric acid | Tartaric acid | Ascorbic acid | Oxalic acid |
| Molarity acid and sucrose | 0 | 0.033 | 0.042 | 0.035 | 0.069 |
| Strength (N/mm$^2$) | 23.8 | 38.5 | 40.5 | 38.3 | 35.2 |
| Ratio (1.00 = reference) | 1.00 | 1.62 | 1.70 | 1.61 | 1.48 |

[a]Aggregate = mix of fine and coarse aggregate;
[b]PCFA = powder coal fly ash;
[c]Slag = blast furnace slag

TABLE 9

Geopolymer mixtures (G45-G47) with different additives

|  | Ref. | G45 | G46 | G47 |
|---|---|---|---|---|
|  | | (grams) | | |
| Aggregate[a] | 1350 | 1350 | 1350 | 1350 |
| PCFA[b] | 350 | 350 | 350 | 350 |
| Slag[c] | 100 | 100 | 100 | 100 |
| Alkaline liquid solution | 160 | 160 | 160 | 160 |
| Additive | 0 | 1 | 1 | 1 |
| Additive | — | Fructose | Lactose | Sodium gluconate |
| Molarity NaOH | 5.0 | 5.0 | 5.0 | 5.0 |
| Molarity sodium silicate | 0.125 | 0.125 | 0.125 | 0.125 |
| Strength (N/mm$^2$) | 23.8 | 38.7 | 30.1 | 33.7 |
| Ratio (1.00 = reference) | 1.00 | 1.63 | 1.26 | 1.42 |

[a]Aggregate = mix of fine and coarse aggregate;
[b]PCFA = powder coal fly ash;
[c]Slag = blast furnace slag

TABLE 10

Geopolymer mixtures (G48-G50) with different concentrations sodium hydroxide

|  | Ref. | G48 | G49 | G50 |
|---|---|---|---|---|
|  | | (grams) | | |
| Aggregate[a] | 1350 | 1350 | 1350 | 1350 |
| PCFA[b] | 350 | 350 | 350 | 350 |
| Slag[c] | 100 | 100 | 100 | 100 |
| Alkaline liquid solution | 160 | 140 | 140 | 140 |
| Sucrose | 0 | 1 | 1 | 1 |
| Molarity sucrose | — | 0.021 | 0.021 | 0.021 |
| Molarity NaOH | 5.6 | 1.0 | 2.0 | 3.0 |
| Molarity sodium silicate | 0.125 | 0.125 | 0.125 | 0.125 |
| Strength (N/mm$^2$) | 18.4 | 5.3 | 28.0 | 31.0 |
| Ratio (1.00 = reference) | 1.00 | 0.29 | 1.52 | 1.68 |

[a]Aggregate = mix of fine and coarse aggregate;
[b]PCFA = powder coal fly ash;
[c]Slag = blast furnace slag

The invention claimed is:

1. A geopolymer activator composition comprising:
   a) alkaline activator having a molarity of 1.0 to 20 M; and
   b) additives having a molarity in the range of 0.001 to 0.10 M,
   wherein the additives are selected from the group consisting of a sugar and derivatives thereof and/or an organic acid and salts thereof.

2. The geopolymer activator composition according to claim 1, wherein the molarity of the alkaline activator is 1.0 to 10 M.

3. The geopolymer activator composition according to claim 1, wherein the molarity of the alkaline activator is 2.0 to 4.0 M.

4. The geopolymer activator composition according to claim 1, further comprising soluble silicate.

5. The geopolymer activator composition according to claim 1, wherein the molarity of the soluble silicate is less than 3.0 M.

6. The geopolymer activator composition according to claim 4, wherein the molarity of the soluble silicate is 0.01 to 2.0 M.

7. The geopolymer activator composition according to claim 1, wherein molarity of the additives is 0.002 to 0.05 M.

8. The geopolymer activator composition according to claim 1, wherein molarity of the additives is 0.02 to 0.04 M.

9. The geopolymer activator composition according to claim 1, wherein the alkaline activator is an alkaline bicarbonate activator, an alkaline silicate activator and/or an alkaline hydroxide activator.

10. The geopolymer activator composition according to claim 1, wherein the alkaline activator is an alkali metal hydroxide selected from the group consisting of sodium hydroxide and/or potassium hydroxide.

11. The geopolymer activator composition according to claim 1, wherein the sugar is selected from the group consisting of monosaccharides, disaccharides, oligosaccharides and polysaccharides and/or the organic acid is selected from carboxylic acids.

12. The geopolymer activator composition according to claim 1, wherein the sugar is selected from the group consisting of glucose, fructose, galactose, sucrose, maltose, lactose, dextrin, maltodextrin, starch, cellulose, dextran, sugar polymer, molasses and combinations thereof.

13. The geopolymer activator composition according to claim 1, wherein the additives are selected from the group consisting of sugar alcohols, natural sugar substitutes and synthetic sugar substitutes.

14. The geopolymer activator composition according to claim 1, wherein the additives are selected from the group consisting of sorbitol, lactitol, glycerol, isomalt, maltitol, mannitol, stevia, xylitol, aspartame, alitame, dulcin, glucin, cyclamate, saccharin, sucralose, lead acetate and combinations thereof.

15. The geopolymer activator composition according to claim 1, wherein the sugar is sucrose, fructose and/or lactose.

16. The geopolymer activator composition according to claim 1, wherein the organic acids are oxalic acid, ascorbic acid, lactic acid, uric acid, citric acid, tartaric acid and combinations thereof.

17. The geopolymer activator composition according to claim 1, wherein the organic acids are tartaric acid and/or ascorbic acid.

18. The geopolymer activator composition according to claim 1, wherein the salts are calcium citrate, sodium citrate and/or sodium gluconate.

19. The geopolymer activator composition according to claim 1, wherein the additives are sucrose, fructose, lactose, tartaric acid, ascorbic acid, sodium gluconate and combinations thereof.

20. The geopolymer activator composition according to claim 1, wherein the geopolymer activator composition does not comprise soluble silicate.

* * * * *